United States Patent
Hayashi et al.

(10) Patent No.: US 8,912,283 B2
(45) Date of Patent: Dec. 16, 2014

(54) FLUORINE-CONTAINING ELASTOMER BLEND

(75) Inventors: Hideki Hayashi, Ibaraki (JP); Mitsuru Maeda, Ibaraki (JP); Akihiko Ikeda, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 13/881,834

(22) PCT Filed: Oct. 19, 2011

(86) PCT No.: PCT/JP2011/074035
§ 371 (c)(1),
(2), (4) Date: Apr. 26, 2013

(87) PCT Pub. No.: WO2012/060224
PCT Pub. Date: May 10, 2012

(65) Prior Publication Data
US 2013/0211007 A1    Aug. 15, 2013

(30) Foreign Application Priority Data
Nov. 2, 2010   (JP) .................................. 2010-246405

(51) Int. Cl.
| | |
|---|---|
| C08F 8/00 | (2006.01) |
| C08L 27/12 | (2006.01) |
| C08F 214/26 | (2006.01) |
| C08L 27/22 | (2006.01) |
| C08F 14/22 | (2006.01) |
| C08L 27/16 | (2006.01) |
| C08F 214/22 | (2006.01) |

(52) U.S. Cl.
CPC ................. *C08L 27/22* (2013.01); *C08F 14/22* (2013.01); *C08L 27/12* (2013.01); *C08L 27/16* (2013.01); *C08L 2205/02* (2013.01); *C08L 2205/03* (2013.01); *C08F 214/22* (2013.01)
USPC ............................ 525/192; 525/199; 525/200

(58) Field of Classification Search
CPC ... C08L 27/12; C08L 2205/025; C08L 27/22; C08L 2023/44
USPC ......................................... 525/192, 199, 200
See application file for complete search history.

(56) References Cited

U.S. PATENT DOCUMENTS

| | | | |
|---|---|---|---|
| 5,218,026 A | 6/1993 | Toda et al. | |
| 6,242,548 B1 | 6/2001 | Duchesne et al. | |
| 6,323,283 B1 * | 11/2001 | Apostolo et al. ............... | 525/199 |
| 2009/0030153 A1 | 1/2009 | Stanga et al. | |

FOREIGN PATENT DOCUMENTS

| | | |
|---|---|---|
| JP | 02-160810 | 6/1990 |
| JP | 04-258614 | 9/1992 |
| JP | 04-268357 | 9/1992 |
| JP | 08-193197 | 7/1996 |
| JP | 10-212322 | 8/1998 |
| JP | 11-181032 | 7/1999 |
| JP | 2000-007732 | 1/2000 |
| JP | 2000-034381 | 2/2000 |
| JP | 2003-165802 | 6/2003 |
| KR | 10-2008-0094668 | 10/2008 |
| WO | WO 00-69969 | 11/2000 |
| WO | WO 2007/085546 A1 | 8/2007 |
| WO | WO 2008/050588 A1 | 5/2008 |

OTHER PUBLICATIONS

International Search Report from corresponding PCT application No. PCT/JP2011/074035 dated Jan. 24, 2012 (4 pgs).
International Preliminary Report on Patentability and Written Opinion from corresponding PCT application No. PCT/JP2011/074035 dated May 23, 2013 (7 pgs).

* cited by examiner

*Primary Examiner* — Nathan M Nutter
(74) *Attorney, Agent, or Firm* — Brinks Gilson & Lione

(57) ABSTRACT

Provided is a fluorine-containing elastomer blend comprising 5 to 60 wt. % of a high-molecular-weight, fluorine-containing elastomer having a number average molecular weight of 3,000,000 or more, 20 to 80 wt. % of a medium-molecular-weight, fluorine-containing elastomer having a number average molecular weight of 100,000 to 1,000,000, and 10 to 50 wt. % of a low-molecular-weight, fluorine-containing elastomer having a number average molecular weight of 7,000 to 13,000; the number average molecular weight Mn of each fluorine-containing elastomer being measured by liquid chromatography using tetrahydrofuran as a developing solvent at a polymer concentration of 0.5 wt. % at a measurement temperature of 35° C. The fluorine-containing elastomer blend can achieve low hardness and low modulus while improving roll processability.

12 Claims, No Drawings

FLUORINE-CONTAINING ELASTOMER BLEND

RELATED APPLICATION

This application is a 35 U.S.C. §371 national phase filing of International Patent Application No. PCT/JP2011/074035, filed Oct. 19, 2011, through which and to which priority is claimed under 35 U.S.C. §119 to Japanese Patent Application No. 2010-246405, filed Nov. 2, 2010.

TECHNICAL FIELD

The present invention relates to a fluorine-containing elastomer blend. More particularly, the present invention relates to a fluorine-containing elastomer blend that can produce a low-hardness vulcanizate and therefore can be suitably used for molding sealing materials.

BACKGROUND ART

Patent Document 1 indicates that a fluorine-containing elastomer comprising vinylidene fluoride units [VdF], hexafluoropropylene units [HFP], and optionally tetrafluoroethylene units [TFE], and having a specific multi-peak type molecular weight distribution and a specific molecular weight exhibits excellent heat resistance, oil resistance, and chemical resistance, undergoes less change in physical properties caused by roll kneading, and has excellent extrudability.

In order to solve the problem of variations in extrusion rate and physical properties in a method described in Patent Document 2 that satisfies both physical properties and extrudability by means of a multi-peak type molecular weight distribution having two or more peaks, Patent Document 1 proposes a fluorine-containing elastomer having the following features:

(a) the molecular weight distribution is a multi-peak type;
(b) the molecular weight at the peak top of the highest molecular weight is 350,000 to 550,000;
(c) the Mw/Mn ratio is 4 to 10;
(d) the intrinsic viscosity is 40 to 200 ml/g; and
(e) the ratio of the content of the component with a molecular weight of 50,000 or less to the intrinsic viscosity number is 0.15 to 0.70.

In Patent Documents 1 and 2, two fluorine-containing elastomers having different molecular weight distributions, which are obtained by a suspension polymerization method, are blended to achieve a multi-peak type molecular weight distribution. Patent Documents 1 and 2 teach that an iodine-containing compound, preferably such as diiodomethane, is used in this case to particularly control the molecular weight of the lower-molecular-weight fluorine-containing elastomer. These patent documents are reportedly intended to improve extrudability; however, as for specific applications, they merely refer to automobile fuel hoses as a typical application.

Patent Document 3 discloses a low-hardness vulcanizable fluororubber composition comprising a fluorine-containing elastomer (not a blend) comprising a copolymer of VdF and HFP or a terpolymer of VdF, HFP, and 35 wt. % or less of TFE, a crosslinking agent, a vulcanization accelerator, and an oxide or hydroxide of a divalent metal; wherein the fluorine-containing elastomer has an intrinsic viscosity number of 50 to 200 ml/g, and has a double-peak type molecular weight distribution in which the molecular weight distribution of the components with a molecular weight of 50,000 or less is 20 to 70%, and with a molecular weight of 1,000,000 or more is 2 to 30%. This composition achieves hardness as low as a JIS-A hardness (spring type hardness) of 50 or less, which is considered to be suitable for use in vibration-absorbing rubber and in seal parts to which sealing properties are required with a low clamping force.

In addition, Patent Document 4, which describes an invention filed by the present applicant, discloses a fluorine-containing elastomer composition comprising a fluorine-containing elastomer for molding fuel system parts, at least one of a polyol-vulcanizing agent and a polyamine-based vulcanizing agent, an organic peroxide, and a polyfunctional unsaturated compound; wherein the fluorine-containing elastomer is copolymerized in the presence of an iodine- and bromine-containing compound represented by the general formula: RBrnIm, having a copolymerization composition comprising 10 to 40 mol % of TFE, 80 to 30 mol % of VdF, and 10 to 30 mol % of HFP, an intrinsic viscosity [η] of 20 to 180 ml/g, an Mw/Mn ratio of 2 to 20, and a mono-peak type or multi-peak type molecular weight distribution.

Such a preferable multi-peak type molecular weight distribution of the fluorine-containing elastomer has two or more peaks of the low-molecular-weight component, which imparts processability, and the high-molecular-weight component, which imparts physical properties. An elastomer containing iodine and bromine groups derived from an iodine- and bromine-containing compound is at least used as the low-molecular-weight component. Actually, a high-molecular-weight polymer and a low-molecular-weight polymer each prepared by an emulsion polymerization method are blended by, for example, mixing latexes of these elastomers in a desired proportion, stirring the resulting mixture, and then adding a saline solution, etc., to perform coagulation.

The thus-obtained fluorine-containing elastomer with a multi-peak type molecular weight distribution is suitably used for molding fuel system parts; however, when the elastomer is used for sealing material applications, a further improvement in hardness is required.

PRIOR ART DOCUMENT

Patent Document

Patent Document 1: JP-A-4-258614
Patent Document 2: JP-A-2-160810
Patent Document 3: JP-A-4-268357
Patent Document 4: WO 2008/050588
Patent Document 5: JP-A-10-212322
Patent Document 6: JP-A-11-181032
Patent Document 7: JP-A-2000-7732
Patent Document 8: JP-A-2003-165802

OUTLINE OF THE INVENTION

Problem to be Solved by the Invention

An object of the present invention is to provide a fluorine-containing elastomer blend that is a blend of a plurality of fluorine-containing elastomers having different molecular weight distributions, and that can achieve low hardness and low modulus while improving roll processability.

Means for Solving the Problem

The above object of the present invention can be achieved by a fluorine-containing elastomer blend comprising 5 to 60 wt. % of a high-molecular-weight, fluorine-containing elastomer having a number average molecular weight of 3,000, 000 or more, 20 to 80 wt. % of a medium-molecular-weight, fluorine-containing elastomer having a number average molecular weight of 100,000 to 1,000,000, and 10 to 50 wt. % of a low-molecular-weight, fluorine-containing elastomer having a number average molecular weight of 7,000 to 13,000; the number average molecular weight Mn of each fluorine-containing elastomer being measured by liquid chromatography using tetrahydrofuran as a developing solvent at a polymer concentration of 0.5 wt. % at a measurement temperature of 35° C.

Effect of the Invention

The fluorine-containing elastomer blend of the present invention can be suitably used for molding sealing materials, because when the blend is vulcanized with a polyol-based vulcanizing agent or an organic peroxide-based crosslinking agent, not only roll processability is excellent, but also low hardness and low modulus can be achieved.

EMBODIMENTS FOR CARRYING OUT THE INVENTION

Usable examples of the high-molecular-weight, medium-molecular-weight, and low-molecular-weight fluorine-containing elastomers are copolymers of vinylidene fluoride and at least one of other fluorine-containing monomers, such as hexafluoropropylene, tetrafluoroethylene, perfluoro(methyl vinyl ether), and chlorotrifluoroethylene. Specific examples of such copolymers include a vinylidene fluoride-hexafluoropropylene copolymer, a vinylidene fluoride-hexafluoropropylene-tetrafluoroethylene terpolymer, a vinylidene fluoride-perfluoro(methyl vinyl ether)-tetrafluoroethylene terpolymer, a vinylidene fluoride-tetrafluoroethylene-chlorotrifluoroethylene terpolymer, a vinylidene fluoride-chlorotrifluoroethylene copolymer, and the like. It is preferable that vinylidene fluoride is copolymerized at about 40 to 90 mol %, preferably about 50 to 80 mol %, in such a fluorine-containing copolymer, in terms of achieving low hardness.

In these fluorine-containing elastomers, an iodine- or bromine-containing unsaturated compound can be copolymerized at about 1 mol % or less, preferably about 0.1 to 0.5 mol %, to form a peroxide crosslinking site. Examples of such an iodine- or bromine-containing unsaturated compound include iodotrifluoroethylene, perfluoro(2-iodoethyl vinyl ether), 2-bromo-1,1-difluoroethylene, bromotrifluoroethylene, 4-bromo-3,3,4,4-tetrafluorobutene-1, perfluoro(2-bromoethyl vinyl ether), and the like.

The number average molecular weight (Mn) of the fluorine-containing elastomers is mainly adjusted by controlling the type and amount of chain transfer agent and polymerization initiator used.

Examples of the chain transfer agent include lower alcohols, such as methanol, ethanol, and isopropanol; ethers, such as dimethyl ether and methyl tert-butyl ether; esters, such as ethyl acetate and ethyl malonate; ketones, such as acetone; $C_1$-$C_6$ aliphatic or alicyclic alkanes; halogenated hydrocarbons, such as carbon tetrachloride, chloroform, and dichloromethane; and the like.

Moreover, a peroxide crosslinking site can also be introduced by a saturated iodine-containing compound or an iodine- and bromine-containing compound that is made present in the copolymerization reaction system. These compounds also act as chain transfer agents. These compounds are well known, as described in Patent Documents 5 to 8. Examples thereof include a saturated iodine-containing compound represented by the general formula: $RI_n$, and an aliphatic or aromatic iodine- and bromine-containing compound represented by the general formula: $InBrmR$. In these general formulae, R is a fluorohydrocarbon group, a chlorofluorohydrocarbon group, a chlorohydrocarbon group, or a hydrocarbon group, and n and m are both 1 or 2.

From the viewpoint that a preferable blend method is such that the three fluorine-containing elastomers are each prepared as aqueous dispersions, and the fluorine-containing elastomer aqueous dispersions are blended with each other to form a fluorine-containing elastomer blend, it is preferable to produce each fluorine-containing elastomer by an emulsion polymerization method. Therefore, as the polymerization initiator, a water-soluble inorganic peroxide, such as ammonium persulfate or potassium persulfate, or a water-soluble azo compound is used singly or as a redox system thereof with a reducing agent, such as sodium bisulfite or sodium sulfite.

As the amounts of chain transfer agent and polymerization initiator used in the emulsion polymerization reaction are reduced, the produced fluorine-containing elastomers generally tend to have a higher number average molecular weight (Mn). For example, a high-molecular-weight fluorine-containing elastomer is obtained by performing a copolymerization reaction using about 0.05 to 0.15 wt. % of isopropanol or a saturated iodine-containing compound as a chain transfer agent based on the total amount of reaction starting materials (here and below, the same basis), and about 0.01 to 0.1 wt. % of a polymerization initiator based on the total amount of reaction starting materials (here and below, the same basis). A medium-molecular-weight fluorine-containing elastomer is obtained by performing a copolymerization reaction using about 0.15 to 0.80 wt. % of a chain transfer agent and about 0.05 to 0.3 wt. % of a polymerization initiator. A low-molecular-weight fluorine-containing elastomer is obtained by performing a copolymerization reaction using about 7 to 12 wt. % of a saturated iodine-containing compound as a chain transfer agent, and about 0.1 to 0.5 wt. % of a polymerization initiator. Note that these figures are just an example; they can vary depending on the copolymerization composition and other polymerization conditions.

The emulsion polymerization reaction is performed by using a water-soluble inorganic peroxide or a redox system of a water-soluble inorganic peroxide and a reducing agent as a catalyst, in the presence of a surfactant, such as $C_3F_7OCF(CF_3)CF_2OCF(CF_3)COONH_4$, $C_7F_{15}COONH_4$, or $C_8F_{17}COONH_4$, which is generally used as an emulsifier in an amount of about 0.001 to 0.2 wt. % based on the total amount of water charged, generally at a pressure of about 0 to 10 MPa, preferably about 0.5 to 4 MPa, and at a temperature of about 0 to 100° C., preferably about 20 to 80° C. In this case, it is preferable to supply a mixture of fluorine-containing monomers in batches so that the reaction pressure is maintained in a predetermined range. Further, an electrolyte matter having a buffer capacity, such as $Na_2HPO_4$, $NaH_2PO_4$, or $KH_2PO_4$, or sodium hydroxide may be added to adjust the pH in the polymerization system.

The fluorine-containing elastomer aqueous dispersions each prepared by emulsion polymerization are mixed with each other in the form of aqueous dispersions so that the proportion of the fluorine-containing elastomers as solid contents is as follows: the high-molecular-weight fluorine-containing elastomer: 5 to 60 wt. %, preferably 10 to 50 wt. %; the medium-molecular-weight fluorine-containing elastomer: 20 to 80 wt. %, preferably 30 to 70 wt. %; low-molecular-weight fluorine-containing elastomer: 10 to 50 wt. %, preferably 20 to 40 wt. %. To the resulting dispersion mixture, a coagulable inorganic salt aqueous solution, such as a potassium alum solution, an NaCl aqueous solution, a KCl aqueous solution, or a $CaCl_2$ aqueous solution, is added to perform co-coagulation. The co-coagulated product is washed with water and dried, thereby obtaining a fluorine-containing elastomer blend.

The reason that the blend proportion of the high-molecular-weight fluorine-containing elastomer, medium-molecular-weight fluorine-containing elastomer, and low-molecular-weight fluorine-containing elastomer is limited to the above range is as follows. When the content of the high-molecular-weight component is greater than the above range, the die swell increases during extrusion molding; whereas when the content of the low-molecular-weight component is greater than the above range, a large lump is produced during coagulation, making water washing difficult, and deteriorating vulcanizate physical properties.

The number average molecular weight (Mn) of each of the high-molecular-weight, medium-molecular-weight, and low-molecular-weight fluorine-containing elastomers is measured under the following conditions:

Liquid chromatograph: SCL-6B, produced by Shimadzu Corporation
Columns: KF-801, KF-802, KF-802.5, and KF-805, produced by Showa Denko K.K.
Detector: SPD-10A, produced by Shimadzu Corporation
Developing solvent: tetrahydrofuran
Polymer concentration: 0.5 wt. %
Measurement temperature: 35° C.

The high-molecular-weight fluorine-containing elastomer has an Mn of 3,000,000 or more, preferably 5,000,000 to 10,000,000; the medium-molecular-weight fluorine-containing elastomer has an Mn of 100,000 to 1,000,000; and the low-molecular-weight fluorine-containing elastomer has an Mn of 7,000 to 13,000, preferably 8,000 to 10,000, as measured by such a method.

When the obtained fluorine-containing elastomer blend does not have a crosslinkable group, i.e., an iodine group or iodine and bromine groups, the blend is co-vulcanized with a polyol vulcanizing agent and a quaternary onium salt vulcanization accelerator that are generally used in the vulcanization of fluorine-containing elastomers. Conversely, when the fluorine-containing elastomer copolymer has a crosslinkable group, i.e., an iodine group or iodine and bromine groups, at the molecular terminal thereof, the copolymer is co-crosslinked with an organic peroxide crosslinking agent and a polyfunctional unsaturated compound co-crosslinking agent that are generally used in the crosslinking of this type of fluorine-containing elastomers. From this viewpoint, it is preferable to use the same vulcanization- or crosslinking-type of high-molecular-weight, medium-molecular-weight, and low-molecular-weight fluorine-containing elastomers. The fluorine-containing elastomer blend to be vulcanized or crosslinked may suitably contain, if necessary, reinforcing agents or fillers, such as carbon black and silica; acid acceptors, such as oxides or hydroxides of divalent metals, or hydrotalcite-like compounds; and the like.

EXAMPLES

The following describes the present invention with reference to Examples.

Example 1

(1) A 10-L stainless steel autoclave was purged with nitrogen gas and deaerated. Then, the following reaction media were charged.

| | |
|---|---|
| Surfactant $C_3F_7OCF(CF_3)CF_2OCF(CF_3)COONH_4$ | 8.5 g |
| $Na_2HPO_4 \cdot 12H_2O$ | 5.0 g |
| Ion exchange water | 5,000 ml |

The autoclave was purged again with nitrogen gas and deaerated. Then, the following reaction starting materials were charged.

| | |
|---|---|
| Vinylidene fluoride [VdF] | 380 g (56.0 mol %) |
| Hexafluoropropylene [HFP] | 700 g (44.0 mol %) |
| Isopropyl alcohol [IPA] | 2.0 g (0.065 wt. %) |

Subsequently, the temperature in the autoclave was adjusted to 80° C. The pressure at this time was 32 relative bar ($32 \times 10^5$ relative Pa). To the autoclave, 0.5 g (0.016 wt. %) of ammonium persulfate [APS] was added as a 0.3 wt. % aqueous solution to initiate a polymerization reaction. The following reaction starting materials were added while maintaining the pressure at 31 to 32 relative bar (31 to $32 \times 10^5$ relative Pa), and copolymerized at 80° C. for 2 hours.

| | |
|---|---|
| VdF | 1,200 g (77.8 mol %) |
| HFP | 800 g (22.2 mol %) |

After completion of the reaction, the reaction mixture was cooled, and the remaining unreacted gas was discharged, thereby obtaining 7,128 g of emulsion (aqueous dispersion I; solid matter content; 29.4 wt. %).

To a part of the aqueous dispersion I, a 10 wt. % NaCl aqueous solution was added to coagulate the polymer, followed by water washing and drying to obtain a copolymer. The number average molecular weight (Mn) of the obtained copolymer measured by the following method was $4,900 \times 10^3$.

Liquid chromatograph: SCL-6B, produced by Shimadzu Corporation
Columns: KF-801, KF-802, KF-802.5, and KF-805, produced by Showa Denko K.K.
Detector: SPD-10A, produced by Shimadzu Corporation
Developing solvent: tetrahydrofuran
Polymer concentration: 0.5 wt. %
Measurement temperature: 35° C.

Moreover, when the copolymerization composition of the copolymer was measured by $^{19}F$-NMR, VdF was 77.7 mol % and HFP was 22.3 mol %.

(2) In the process (1) above, the amount of IPA was changed to 5.0 g (0.162 wt. %), and the amount of APS was changed to 3.0 g (0.097 wt. %), respectively, thereby obtaining 7,128 g of emulsion (aqueous dispersion II; solid matter content: 29.8 wt. %; copolymer Mn: $185 \times 10^3$; copolymerization composition: 77.4 mol % of VdF and 22.6 mol % of HFP).

(3) In the process (1) above, 270 g (8.77 wt. %) of $CF_3(CF_2)_4CF_2I$ [FHI] was used in place of IPA, and the amount of APS was changed to 7.0 g (0.227 wt. %), thereby obtaining 7,152 g of emulsion (aqueous dispersion III; solid matter content: 30.2 wt. %; copolymer Mn: $9.4 \times 10^3$; copolymerization composition: 77.9 mol % of VdF and 22.1 mol % of HFP).

(4) The aqueous dispersions I, II, and III were mixed in a weight ratio of 20:50:30. The mixture was further mixed with 10 wt. % NaCl aqueous solution in a weight ratio of 1:1 to co-coagulate the polymer, followed by water washing and drying, thereby obtaining 2,015 g of a fluorine-containing elastomer A (blend) having a copolymerization composition comprising 77.6 mol % of VdF and 22.4 mol % of HFP (measured by $^{19}$F-NMR) and a Mooney viscosity $ML_{1+10}$ (121° C.) of 68.

Example 2

(1) A 10-L stainless steel autoclave was purged with nitrogen gas and deaerated. Then, the following reaction media were charged.

| Surfactant $C_3F_7OCF(CF_3)CF_2OCF(CF_3)COONH_4$ | 19.3 g |
|---|---|
| $Na_2HPO_4 \cdot 12H_2O$ | 10.0 g |
| Ion exchange water | 5,200 ml |

The autoclave was purged again with nitrogen gas and deaerated. Then, the following reaction starting materials were charged.

| Vinylidene fluoride [VdF] | 101 g (34.3 mol %) |
|---|---|
| Tetrafluoroethylene [TFE] | 49 g (10.6 mol %) |
| Hexafluoropropylene [HFP] | 380 g (55.1 mol %) |
| Isopropyl alcohol [IPA] | 2.0 g (0.074 wt. %) |

Subsequently, the temperature in the autoclave was adjusted to 80° C. The pressure at this time was 30 relative bar (30×10$^5$ relative Pa). To the autoclave, 0.8 g (0.030 wt. %) of ammonium persulfate [APS] was added as a 0.3 wt. % aqueous solution to initiate a polymerization reaction. The following reaction starting materials were added while maintaining the pressure at 29 to 30 relative bar (29 to 30×10$^5$ relative Pa), and copolymerized at 80° C. for 2 hours.

| VdF | 1,034 g (63.5 mol %) |
|---|---|
| TFE | 496 g (19.5 mol %) |
| HFP | 650 g (17.0 mol %) |

After completion of the reaction, the reaction mixture was cooled, and the remaining unreacted gas was discharged, thereby obtaining 7,448 g of emulsion (aqueous dispersion IV; solid matter content; 28.5 wt. %; copolymer Mn: 4,400×10$^3$; copolymerization composition: 64.0 mol % of VdF, 19.2 mol % of TFE, and 16.8 mol % of HFP).

(2) In the process (1) above, the amount of IPA was changed to 9.0 g (0.332 wt. %), and the amount of APS was changed to 3.0 g (0.111 wt. %), respectively, thereby obtaining 7,422 g of emulsion (aqueous dispersion V; solid matter content: 29.2 wt. %; copolymer Mn: 193×10$^3$; copolymerization composition: 64.5 mol % of VdF, 19.1 mol % of TFE, and 16.4 mol % of HFP).

(3) In the process (1) above, 270 g (9.96 wt. %) of $CF_3(CF_2)_4CF_2I$ [FHI] was used in place of IPA, and the amount of APS was changed to 9.0 g (0.332 wt. %), thereby obtaining 7,522 g of emulsion (aqueous dispersion VI; solid matter content: 30.4 wt. %; copolymer Mn: 8.8×10$^3$; copolymerization composition: 64.4 mol % of VdF, 19.6 mol % of TFE, and 16.0 mol % of HFP).

(4) The aqueous dispersions IV, V, and VI were mixed in a weight ratio of 20:50:30. The mixture was further mixed with 10 wt. % NaCl aqueous solution in a weight ratio of 1:1 to co-coagulate the polymer, followed by water washing and drying, thereby obtaining 2,094 g of a fluorine-containing elastomer B (blend) having a copolymerization composition comprising 64.3 mol % of VdF, 19.3 mol % of TFE, and 16.4 mol % of HFP (measured by $^{19}$F-NMR) and a Mooney viscosity $ML_{1+10}$ (121° C.) of 71.

Example 3

(1) A 10-L stainless steel autoclave was purged with nitrogen gas and deaerated. Then, the following reaction media were charged.

| Surfactant $C_3F_7OCF(CF_3)CF_2OCF(CF_3)COONH_4$ | 19.3 g |
|---|---|
| $Na_2HPO_4 \cdot 12H_2O$ | 10.0 g |
| Ion exchange water | 5,200 ml |

The autoclave was purged again with nitrogen gas and deaerated. Then, the following reaction starting materials were charged.

| Vinylidene fluoride [VdF] | 101 g (34.3 mol %) |
|---|---|
| Tetrafluoroethylene [TFE] | 49 g (10.6 mol %) |
| Hexafluoropropylene [HFP] | 380 g (55.1 mol %) |
| 2-bromo-1,1-difluoroethylene [BDFE] | 8.3 g |
| Octafluoro-1,4-diiodobutane [DIOFB] | 3.0 g (0.111 wt. %) |

Subsequently, the temperature in the autoclave was adjusted to 80° C. The pressure at this time was 30 relative bar (30×10$^5$ relative Pa). To the autoclave, 1.0 g (0.037 wt. %) of ammonium persulfate [APS] was added as a 0.3 wt. % aqueous solution to initiate a polymerization reaction. The following reaction starting materials were added while maintaining the pressure at 29 to 30 relative bar (29 to 30×10$^5$ relative Pa), and copolymerized at 80° C. for 2 hours.

| VdF | 1,034 g (63.5 mol %) |
|---|---|
| TFE | 496 g (19.5 mol %) |
| HFP | 650 g (17.0 mol %) |

After completion of the reaction, the reaction mixture was cooled, and the remaining unreacted gas was discharged, thereby obtaining 7,326 g of emulsion (aqueous dispersion VII; solid matter content; 30.5 wt. %; copolymer Mn: 3,800×10$^3$; copolymerization composition: 65.5 mol % of VdF, 19.1 mol % of TFE, and 15.4 mol % of HFP).

(2) In the process (1) above, the amount of DIOFB was changed to 15.0 g (0.554 wt. %), and the amount of APS was changed to 3.0 g (0.111 wt. %), respectively, thereby obtaining 7,326 g of emulsion (aqueous dispersion VIII; solid matter content: 31.1 wt. %; copolymer Mn: 187×10$^3$; copolymerization composition: 64.0 mol % of VdF, 19.5 mol % of TFE, and 16.5 mol % of HFP).

(3) In the process (1) above, 270 g (9.96 wt. %) of $CF_3(CF_2)_4CF_2I$ [FHI] was used in place of BDFE and DIOFB, and the amount of APS was changed to 9.0 g (0.332 wt. %), thereby obtaining 7,382 g of emulsion (aqueous dispersion IX; solid matter content: 30.8 wt. %; copolymer Mn: 10.5×10$^3$; copolymerization composition: 65.8 mol % of VdF, 19.3 mol % of TFE, and 14.9 mol % of HFP).

(4) The aqueous dispersions VII, VIII, and IX were mixed in a weight ratio of 20:50:30. The mixture was further mixed with 2 wt. % CaCl aqueous solution in a weight ratio of 1:1 to co-coagulate the polymer, followed by water washing and drying, thereby obtaining 2,121 g of a fluorine-containing elastomer C (blend) having a copolymerization composition comprising 64.8 mol % of VdF, 19.4 mol % of TFE, and 15.8 mol % of HFP (measured by $^{19}$F-NMR) and a Mooney viscosity $ML_{1+10}$ (121° C.) of 73.

Example 4

(1) A 10-L stainless steel autoclave was purged with nitrogen gas and deaerated. Then, the following reaction media were charged.

| | |
|---|---|
| Surfactant $C_3F_7OCF(CF_3)CF_2OCF(CF_3)COONH_4$ | 35 g |
| $Na_2HPO_4 \cdot 12H_2O$ | 17 g |
| Ion exchange water | 5,500 ml |

The autoclave was purged again with nitrogen gas and deaerated. Then, the following reaction starting materials were charged.

| | |
|---|---|
| Vinylidene fluoride [VdF] | 550 g (57.0 mol %) |
| Tetrafluoroethylene [TFE] | 120 g (8.0 mol %) |
| Perfluoro(methyl vinyl ether) [FMVE] | 880 g (35.0 mol %) |
| Octafluoro-1,4-diiodobutane [DIOFB] | 3.0 g (0.101 wt. %) |

Subsequently, the temperature in the autoclave was adjusted to 80° C. The pressure at this time was 30 relative bar (30×10$^5$ relative Pa). To the autoclave, 0.5 g (0.019 wt. %) of ammonium persulfate [APS] and 0.05 g of sodium bisulfite [SBS], which were to form a redox system, were added as a 0.3 wt. % aqueous solution to initiate a polymerization reaction. The following reaction starting materials were added while maintaining the pressure at 29 to 30 relative bar (29 to 30×10$^5$ relative Pa), and copolymerized at 50° C. for 2 hours.

| | |
|---|---|
| VdF | 930 g (79.6 mol %) |
| TFE | 210 g (11.5 mol %) |
| FMVE | 270 g (8.9 mol %) |

While the temperature was maintained at 50° C., the pressure was reduced to 1 relative bar (1×10$^5$ relative Pa). Thereafter, the reaction mixture was cooled, and the remaining unreacted gas was discharged, thereby obtaining 8,652 g of emulsion (aqueous dispersion X; solid matter content; 33.4 wt. %; copolymer Mn: 3,100×10$^3$; copolymerization composition: 70.1 mol % of VdF, 12.4 mol % of TFE, and 17.5 mol % of FMVE).

(2) In the process (1) above, the amount of DIOFB was changed to 13.0 g (0.439 wt. %), the amount of APS was changed to 1.0 g (0.037 wt. %), and the amount of SBS was changed to 0.10 g, respectively, thereby obtaining 8,677 g of emulsion (aqueous dispersion XI; solid matter content: 33.4 wt. %; copolymer Mn: 204×10$^3$; copolymerization composition: 69.7 mol % of VdF, 11.7 mol % of TFE, and 18.6 mol % of FMVE).

(3) In the process (1) above, 270 g (9.12 wt. %) of $CF_3(CF_2)_4CF_2I$ [FHI] was used in place of DIOFB, the amount of APS was changed to 9.0 g (0.334 wt. %), and the amount of SBS was changed to 0.9 g, respectively, thereby obtaining 8,625 g of emulsion (aqueous dispersion XII; solid matter content: 33.8 wt. %; copolymer Mn: 9.8×10$^3$; copolymerization composition: 70.5 mol % of VdF, 12.3 mol % of TFE, and 17.2 mol % of FMVE).

(4) The aqueous dispersions X, XI, and XII were mixed in a weight ratio of 20:50:30. The mixture was further mixed with 10 wt. % NaCl aqueous solution in a weight ratio of 1:1 to co-coagulate the polymer, followed by water washing and drying, thereby obtaining 2,778 g of a fluorine-containing elastomer D (blend) having a copolymerization composition comprising 70.0 mol % of VdF, 12.0 mol % of TFE, and 18.0 mol % of FMVE (measured by $^{19}$F-NMR) and a Mooney viscosity $ML_{1+10}$ (121° C.) of 69.

Comparative Example 1

The aqueous dispersion II was mixed with 10 wt. % NaCl aqueous solution in a weight ratio of 1:1 to coagulate the polymer, followed by water washing and drying, thereby obtaining 1,974 g of a fluorine-containing elastomer E having a copolymerization composition comprising 77.4 mol % of VdF and 22.6 mol % of HFP, and a Mooney viscosity $ML_{1+10}$ (121° C.) of 70.

Comparative Example 2

The aqueous dispersion V was mixed with 10 wt. % NaCl aqueous solution in a weight ratio of 1:1 to coagulate the polymer, followed by water washing and drying, thereby obtaining 2,055 g of a fluorine-containing elastomer F having a copolymerization composition comprising 64.5 mol % of VdF, 19.1 mol % of TFE, and 16.4 mol % of HFP, and a Mooney viscosity $ML_{1+10}$ (121° C.) of 74.

Comparative Example 3

The aqueous dispersions I and III were mixed in a weight ratio of 70:30. The resulting mixture was further mixed with 10 wt. % NaCl aqueous solution in a weight ratio of 1:1 to co-coagulate the polymer, followed by water washing and drying, thereby obtaining 2,028 g of a fluorine-containing elastomer G (blend) having a copolymerization composition comprising 77.8 mol % of VdF and 22.2 mol % of HFP (measured by $^{19}$F-NMR), and a Mooney viscosity $ML_{1+10}$ (121° C.) of 50.

Comparative Example 4

The aqueous dispersions IV and VI were mixed in a weight ratio of 70:30. The resulting mixture was further mixed with 10 wt. % NaCl aqueous solution in a weight ratio of 1:1 to co-coagulate the polymer, followed by water washing and drying, thereby obtaining 2,098 g of a fluorine-containing elastomer H (blend) having a copolymerization composition comprising 64.1 mol % of VdF, 19.3 mol % of TFE, and 16.6 mol % of HFP (measured by $^{19}$F-NMR), and a Mooney viscosity $ML_{1+10}$ (121° C.) of 55.

Comparative Example 5

The aqueous dispersion VIII was mixed with 10 wt. % NaCl aqueous solution in a weight ratio of 1:1 to coagulate the polymer, followed by water washing and drying, thereby obtaining 2,043 g of a fluorine-containing elastomer I having a copolymerization composition comprising 64.0 mol % of VdF, 19.5 mol % of TFE, and 16.5 mol % of HFP, and a Mooney viscosity $ML_{1+10}$ (121° C.) of 42.

Comparative Example 6

The aqueous dispersion XI was mixed with 10 wt. % NaCl aqueous solution in a weight ratio of 1:1 to coagulate the polymer, followed by water washing and drying, thereby obtaining 2,844 g of a fluorine-containing elastomer J having a copolymerization composition comprising 69.7 mol % of VdF, 11.7 mol % of TFE, and 18.6 mol % of FMVE, and a Mooney viscosity $ML_{1+10}$ (121° C.) of 80.

Comparative Example 7

The aqueous dispersions VII and IX were mixed in a weight ratio of 70:30. The resulting mixture was further mixed with 10 wt. % NaCl aqueous solution in a weight ratio of 1:1 to co-coagulate the polymer, followed by water washing and drying, thereby obtaining 2,108 g of a fluorine-containing elastomer K (blend) having a copolymerization composition comprising 65.5 mol % of VdF, 19.2 mol % of TFE, and 15.3 mol % of HFP (measured by $^{19}$F-NMR), and a Mooney viscosity $ML_{1+10}$ (121° C.) of 53.

To 100 parts (by weight; the same hereinafter) of each of the fluorine-containing elastomers obtained in Examples 1 and 2, and Comparative Examples 1 to 4, the following components were added:

| | |
|---|---|
| MT carbon black (Thermax N990, produced by Cancarb Ltd.) | 25 parts |
| Vulcanizing agent (bisphenol AF) | 2 Parts |
| Vulcanization accelerator (benzyltriphenylphosphonium chloride) | 0.5 parts |
| Acid acceptor (Kyowamag #150, produced by Kyowa Chemical Industry Co., Ltd.) | 3 parts |
| Acid acceptor (Caldic #2000, produced by Ohmi Chemical Industry Co., Ltd.) | 5 parts |

The resulting mixture was mixed by a two-roll mill. The obtained curable composition was compression-molded at 180° C. for 10 minutes to form a sheet (thickness: 2 mm) and an O ring (P24). The sheet and the O ring were further subjected to oven vulcanization (secondary vulcanization) at 230° C. for 22 hours.

Moreover, to 100 parts of each of the fluorine-containing elastomers obtained in Examples 3 and 4, and Comparative Examples 5 to 7, the following components were added:

| | |
|---|---|
| MT carbon black (Thermax N990) | 30 parts |
| Co-crosslinking agent (TRIC M60, produced by Nippon Kasei Chemical Co., Ltd.; triallyl isocyanurate) | 6 parts |
| Organic peroxide (Perhexa 25B-40, produced by NOF Corporation) | 1.4 parts |
| ZnO | 4 parts |

The resulting mixture was mixed by a two-roll mill. The obtained curable composition was compression-molded at 180° C. for 10 minutes to form a sheet (thickness: 2 mm) and an O ring (P24). The sheet and the O ring were further subjected to oven vulcanization (secondary vulcanization) at 230° C. for 22 hours.

The obtained secondary vulcanizates were subjected to the following various tests. The table below shows the obtained results and the type of fluorine-containing elastomer used.

Normal state physical properties: According to JIS K6250 and K6253 corresponding to ASTM D412 and ASTM D2240

Compression set: According to ASTM D395 Method B Using the P24 O ring, the values at 200° C. for 70 hours and at 230° C. for 70 hours were measured Roll processability:

Wrapping properties
  ○: Well adhering to the roll
  Δ: Tending to slightly peel off the roll
  ×: Peeling off the roll during kneading Moist texture
  ○: Compound is moist rather than dried
  Δ: Compound is less moist and slightly dried
  ×: Compound is not moist and is strongly dried Filler-kneading properties
  ○: Filler does not fall under the roll
  Δ: Filler slightly falls under the roll
  ×: Filler falls under the roll, and frequent resupply is required

TABLE

| | Example | | | | Comparative Example | | | | | | |
|---|---|---|---|---|---|---|---|---|---|---|---|
| | 1 | 2 | 3 | 4 | 1 | 2 | 3 | 4 | 5 | 6 | 7 |
| [Fluorine-containing elastomer] | | | | | | | | | | | |
| Type | A | B | C | D | E | F | G | H | I | J | K |
| [Normal state physical properties] | | | | | | | | | | | |
| Hardness (Duro A) | 61 | 60 | 65 | 64 | 69 | 69 | 62 | 62 | 72 | 70 | 67 |
| 100% modulus (MPa) | 2.8 | 2.8 | 3.1 | 3.9 | 3.9 | 3.8 | 3.1 | 3.0 | 4.0 | 5.7 | 3.3 |
| Strength at break (MPa) | 14.6 | 13.9 | 14.4 | 17.9 | 14.5 | 14.7 | 15.0 | 15.2 | 13.2 | 18.2 | 15.5 |
| Elongation at break (%) | 300 | 350 | 300 | 280 | 250 | 300 | 280 | 330 | 280 | 230 | 280 |
| [Compression set] | | | | | | | | | | | |
| 200° C., 70 hrs (%) | 11 | 24 | 39 | 32 | 13 | 25 | 13 | 23 | 42 | 33 | 38 |
| 230° C., 70 hrs (%) | 29 | 39 | 62 | 57 | 30 | 40 | 32 | 38 | 65 | 61 | 59 |
| [Roll processability] | | | | | | | | | | | |
| Wrapping properties | ○ | ○ | ○ | ○ | Δ | Δ | ○ | ○ | Δ | Δ | ○ |
| Moist texture | ○ | ○ | ○ | ○ | X | X | Δ | Δ | X | X | Δ |
| Filler-kneading properties | ○ | ○ | ○ | ○ | Δ | Δ | ○ | ○ | Δ | Δ | ○ |

The invention claimed is:

1. A sealing material molded by polyol-vulcanization of a fluorine-containing elastomer blend comprising:
   5 to 60 wt. % of a high-molecular-weight, fluorine-containing elastomer having a number average molecular weight of 3,000,000 or more;
   20 to 80 wt. % of a medium-molecular-weight, fluorine-containing elastomer having a number average molecular weight of 100,000 to 1,000,000; and
   10 to 50 wt. % of a low-molecular-weight, fluorine-containing elastomer having a number average molecular weight of 7,000 to 13,000;
   the number average molecular weight Mn of each fluorine-containing elastomer being measured by liquid chromatography using tetrahydrofuran as a developing solvent at a polymer concentration of 0.5 wt. % at a measurement temperature of 35° C.

2. The sealing material according to claim 1, wherein the amount of the high-molecular-weight, fluorine-containing elastomer is 10 to 50 wt. %, the amount of the medium-molecular-weight, fluorine-containing elastomer is 30 to 70 wt. %, and the amount of the low-molecular-weight, fluorine-containing elastomer is 20 to 40 wt. %.

3. The sealing material according to claim 1, wherein each of the fluorine-containing elastomers is a copolymer of vinylidene fluoride and an other fluorine-containing monomer.

4. The sealing material according to claim 3, wherein the other fluorine-containing monomer is at least one of hexafluoropropylene, tetrafluoroethylene, perfluoro(methyl vinyl ether), and chlorotrifluoroethylene.

5. The sealing material according to claim 4, wherein each of the fluorine-containing elastomers is a vinylidene fluoride-hexafluoropropylene copolymer, a vinylidene fluoride-hexafluoropropylene-tetrafluoroethylene terpolymer, a vinylidene fluoride-perfluoro(methyl vinyl ether)-tetrafluoroethylene terpolymer, a vinylidene fluoride-tetrafluoroethylene-chlorotrifluoroethylene terpolymer, or a vinylidene fluoride-chlorotrifluoroethylene copolymer.

6. The sealing material according to claim 5, wherein each of the fluorine-containing elastomers is a copolymer in which vinylidene fluoride is copolymerized at 40 to 90 mol %.

7. The sealing material according to claim 1, wherein the blend is obtained by mixing the high-molecular-weight, fluorine-containing elastomer, medium-molecular-weight, fluorine-containing elastomer, and low-molecular-weight, fluorine-containing elastomer, each of which has been prepared as an aqueous dispersion, and then adding a coagulable inorganic salt aqueous solution to perform co-coagulation.

8. The sealing material according to claim 2, wherein each of the fluorine-containing elastomers is a copolymer of vinylidene fluoride and an other fluorine-containing monomer.

9. The sealing material according to claim 8, wherein the other fluorine-containing monomer is at least one of hexafluoropropylene, tetrafluoroethylene, perfluoro(methyl vinyl ether), and chlorotrifluoroethylene.

10. The sealing material according to claim 9, wherein each of the fluorine-containing elastomers is a vinylidene fluoride-hexafluoropropylene copolymer, a vinylidene fluoride-hexafluoropropylene-tetrafluoroethylene terpolymer, a vinylidene fluoride-perfluoro(methyl vinyl ether)-tetrafluoroethylene terpolymer, a vinylidene fluoride-tetrafluoroethylene-chlorotrifluoroethylene terpolymer, or a vinylidene fluoride-chlorotrifluoroethylene copolymer.

11. The sealing material according to claim 10, wherein each of the fluorine-containing elastomers is a copolymer in which vinylidene fluoride is copolymerized at 40 to 90 mol %.

12. A polyol-vulcanizable, fluorine-containing elastomer blend comprising:
    5 to 60 wt. % of a high-molecular-weight, fluorine-containing elastomer having a number average molecular weight of 3,000,000 or more;
    20 to 80 wt. % of a medium-molecular-weight, fluorine-containing elastomer having a number average molecular weight of 100,000 to 1,000,000; and
    10 to 50 wt. % of a low-molecular-weight, fluorine-containing elastomer having a number average molecular weight of 7,000 to 13,000;
    the number average molecular weight Mn of each fluorine-containing elastomer being measured by liquid chromatography using tetrahydrofuran as a developing solvent at a polymer concentration of 0.5 wt. % at a measurement temperature of 35° C.,
    wherein the low-molecular-weight fluorine-containing elastomer contains iodine as a crosslinking group and the high-molecular-weight fluorine-containing elastomer and the medium-molecular-weight fluorine-containing elastomer contain no iodine as a crosslinking group.

* * * * *